United States Patent
Kuo et al.

(10) Patent No.: US 8,269,743 B2
(45) Date of Patent: Sep. 18, 2012

(54) TOUCH SENSING DISPLAY PANEL AND TOUCH SENSING SUBSTRATE

(75) Inventors: Chun-Ku Kuo, Taoyuan County (TW); Po-Yuan Liu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 629 days.

(21) Appl. No.: 12/497,546

(22) Filed: Jul. 2, 2009

(65) Prior Publication Data

US 2010/0220075 A1 Sep. 2, 2010

(30) Foreign Application Priority Data

Mar. 2, 2009 (TW) ................................ 98106672 A

(51) Int. Cl.
*G06F 3/045* (2006.01)
(52) U.S. Cl. ........................................ 345/174; 345/173
(58) Field of Classification Search .................. 345/173, 345/174
See application file for complete search history.

(56) References Cited

U.S. PATENT DOCUMENTS

| | | | |
|---|---|---|---|
| 4,380,040 A | 4/1983 | Posset | |
| 5,063,306 A | 11/1991 | Edwards | |
| 5,594,222 A | 1/1997 | Caldwell | |
| 7,352,355 B2 | 4/2008 | Troxell et al. | |
| 7,361,860 B2 | 4/2008 | Caldwell | |
| 2006/0066585 A1* | 3/2006 | Lin | 345/173 |
| 2006/0097991 A1 | 5/2006 | Hotelling et al. | |
| 2007/0062739 A1* | 3/2007 | Philipp et al. | 178/18.06 |
| 2009/0085885 A1 | 4/2009 | Wu et al. | |
| 2009/0213090 A1* | 8/2009 | Mamba et al. | 345/174 |
| 2009/0303400 A1* | 12/2009 | Hou et al. | 349/12 |
| 2010/0007631 A1* | 1/2010 | Chang | 345/174 |
| 2010/0066702 A1* | 3/2010 | Lee et al. | 345/174 |

FOREIGN PATENT DOCUMENTS

| | | |
|---|---|---|
| CN | 101131492 | 2/2008 |
| JP | 61-6726 | 1/1986 |

OTHER PUBLICATIONS

U.S. Appl. No. 12/344,594, filed Dec. 29, 2008, Chien et al.
"1st Office Action of China counterpart application", issued on Feb. 12, 2010, p. 1-11.

* cited by examiner

*Primary Examiner* — Amare Mengistu
*Assistant Examiner* — Koosha Sharifi-Tafreshi
(74) *Attorney, Agent, or Firm* — Jianq Chyun IP Office

(57) ABSTRACT

A touch sensing display panel includes an active device array substrate, an opposite substrate, a display medium layer, a plurality of inner and outer electrode series. The opposite substrate is disposed over the active device array substrate and the display medium layer is disposed between the active device array substrate and the opposite substrate. The inner electrode series are disposed on the opposite substrate and extend along a first direction, wherein each inner electrode series includes inner ring electrodes electrically connected to each other. The outer electrode series are disposed on the opposite substrate and extend along a second direction, wherein each outer electrode series includes outer ring electrodes electrically connected to each other. Each inner ring electrodes is respectively surrounded by one of the outer ring electrodes, and the first direction is substantially perpendicular to the second direction. The present invention also provides a touch sensing substrate.

38 Claims, 9 Drawing Sheets

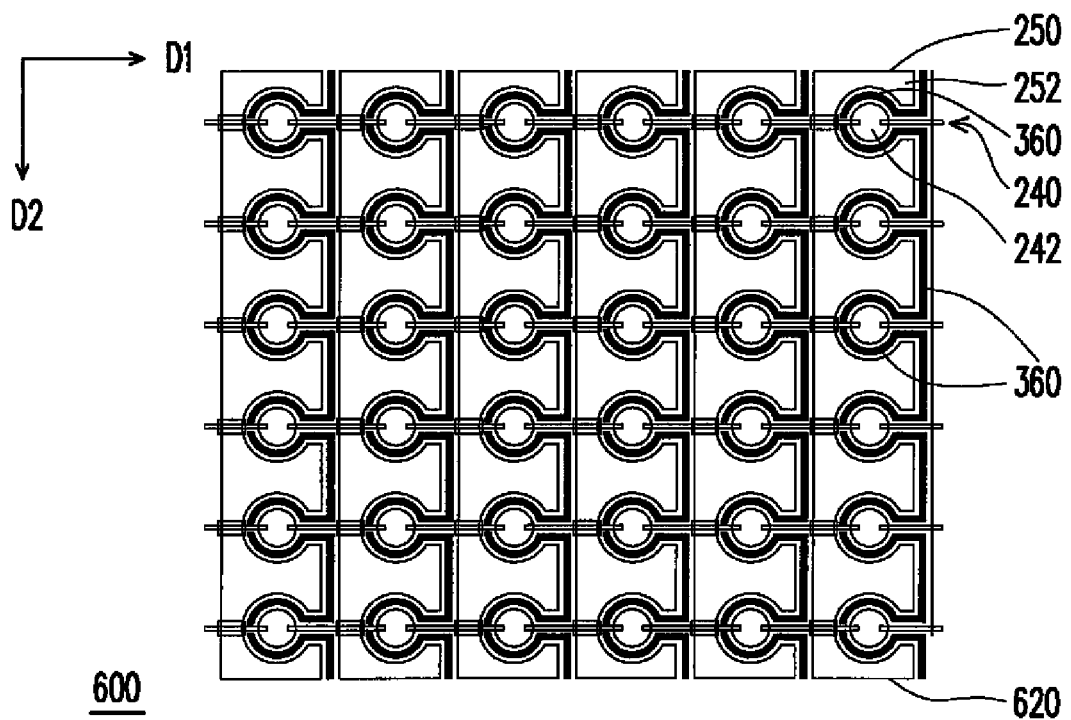
FIG. 6A
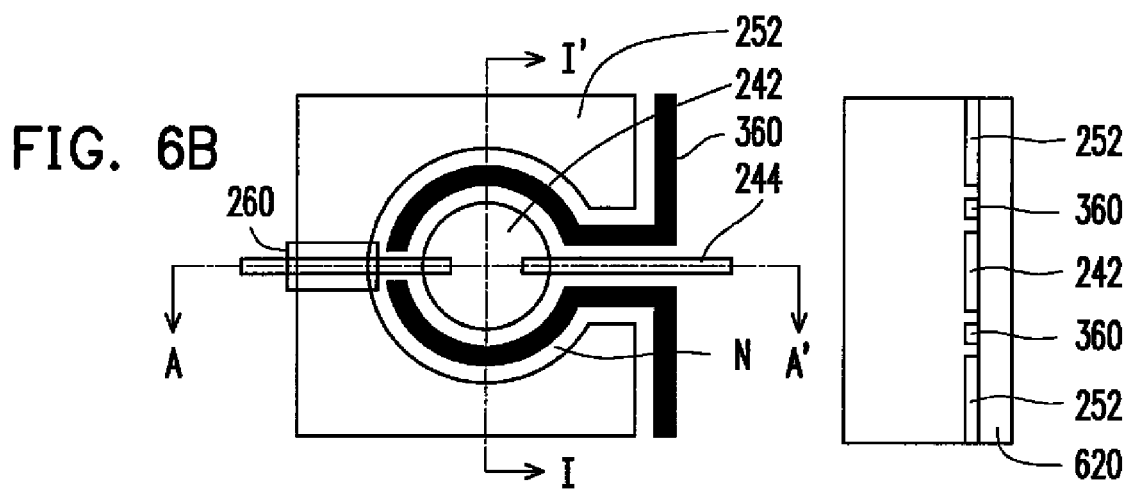
FIG. 6B
FIG. 6C
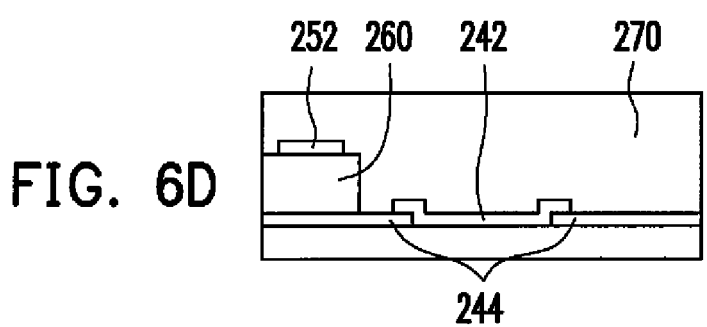
FIG. 6D

TOUCH SENSING DISPLAY PANEL AND TOUCH SENSING SUBSTRATE

CROSS-REFERENCE TO RELATED APPLICATION

This application claims the priority benefit of Taiwan application serial no. 98106672, filed Mar. 2, 2009. The entirety of the above-mentioned patent application is hereby incorporated by reference herein and made a part of specification.

BACKGROUND OF THE INVENTION

1. Field of the Invention

The present invention generally relates to a touch sensing display panel, and more particularly, to a capacitive touch sensing display panel.

2. Description of Related Art

In recent years, along with the rapid developments of the various applications of information technology, wireless mobile phones and information household appliances, to achieve the goals of more convenient usage, more compact design and more humanized features, many information products have changed their input devices from traditional keyboard or mouse to touch sensing display panel. In terms of the sensing methodology, in general, touch sensing display panels can be roughly categorized into resistive type, capacitive type, optical type, acoustic type and electromagnetic type. Taking a capacitive touch sensing display panel as an example, based on the driving and the sensing manner, the capacitive touch sensing display panel can be further divided into self capacitive touch sensing display panel and mutual capacitive touch sensing display panel.

A conventional self capacitive touch sensing display panel includes a plurality of first electrode series extending along the X-axis direction and a plurality of second electrode series extending along the Y-axis direction, wherein the X-axis direction is different from the Y-axis direction. When a human's finger touches the above-mentioned self capacitive touch sensing display panel, the touched electrode in the panel functions for both sensing and driving.

FIGS. 1A and 1B are respectively a localized cross-sectional diagram and a top-view diagram of a conventional mutual capacitive touch sensing display panel. Referring to FIGS. 1A and 1B, a conventional mutual capacitive touch sensing display panel 100 includes a substrate 110, an opposite substrate 120, a display medium layer 130, a touch sensing substrate 160, a plurality of first electrode series 140 extending along the X-axis direction and a plurality of second electrode series 150 extending along the Y-axis direction, wherein the X-axis direction is different from the Y-axis direction. The first electrode series 140 includes a plurality of first electrodes 142 and the second electrode series 150 includes a plurality of second electrodes 152. It should be noted that the first electrode series 140 and the second electrode series 150 are fabricated by using different thin film deposition and etching processes.

FIG. 1C is a diagram showing the usual electric field lines generated by an electrode and FIG. 1D is a diagram showing the electric field lines generated by an electrode touched by a conductor. When a person touches the mutual capacitive touch sensing display panel 100 with a finger, the parasitic capacitance of the finger and the parasitic capacitance of the touched sensing electrode are equivalently connected in series to each other, which results in changing the capacitance between the first electrode 142 and the second electrode 152. By delivering the changed signal to a controller, the coordinates of an instantly touching point can be derived. Since the first electrode series 140 and the second electrode series 150 are fabricated by using different thin film deposition processes, so that when a user manipulates the above-mentioned mutual capacitive touch sensing display panel 100, the inconsistent transmittances caused respectively by the first electrode series 140 and the second electrode series 150 and the phenomenon of decreased transmittances can be easily observed.

In this regard, how to improve the transmittance uniformity on the entire frame of a capacitive touch sensing display panel and to promote the transmittance thereof has become one of the projects for the manufacturing of a touch sensing display panel to be solved today.

SUMMARY OF THE INVENTION

Accordingly, the present invention is directed to a touch sensing display panel with better visual effect and transmittance uniformity.

The present invention is also directed to a touch sensing substrate with better visual effect and transmittance uniformity.

The present invention provides a touch sensing display panel, which includes an active device array substrate, an opposite substrate, a display medium layer, a plurality of inner electrode series and a plurality of outer electrode series. The opposite substrate is disposed over the active device array substrate and the display medium layer is disposed between the active device array substrate and the opposite substrate. The inner electrode series are disposed on the opposite substrate and extend along a first direction, wherein each of the inner electrode series includes a plurality of inner ring electrodes electrically connected to each other. The outer electrode series are disposed on the opposite substrate and extend along a second direction, wherein each of the outer electrode series includes a plurality of outer ring electrodes electrically connected to each other. Each of the inner ring electrodes is respectively surrounded by one of the outer ring electrodes, and the first direction is different from the second direction.

The present invention also provides a touch sensing substrate, which includes a substrate, a plurality of inner electrode series, a plurality of outer electrode series and a plurality of floating electrodes. The inner electrode series are disposed on the substrate and extend along a first direction, wherein each of the inner electrode series includes a plurality of inner ring electrodes electrically connected to each other. The outer electrode series are disposed on the substrate and extend along a second direction, wherein each of the outer electrode series includes a plurality of outer ring electrodes electrically connected to each other. Each of the inner ring electrodes is respectively surrounded by one of the outer ring electrodes and the first direction and the second direction are different from each other. The floating electrodes are disposed on the substrate and surround the outer electrode series and the inner electrode series.

Based on the described above, the touch sensing display panel and touch sensing substrate of the present invention can have increased overall light transmittance and improved light transmittance and visual effect for the entire frame of the capacitive touch sensing display panel.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6A is a top-view diagram of a touch sensing substrate of the present invention.

FIG. 6B is a localized enlarged diagram of FIG. 6A.

FIGS. 6C and 6D are respectively the cross-sectional diagrams of FIG. 6A along line I-I' and line A-A'.

DESCRIPTION OF THE EMBODIMENTS

Figure 1A:
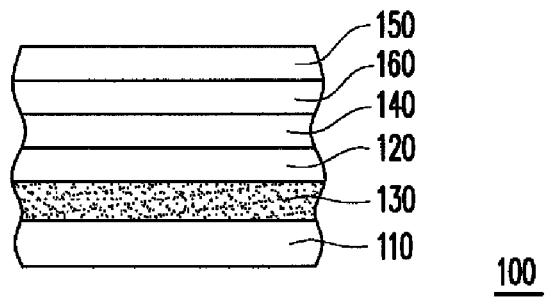
FIGS. 1A and 1B are respectively a localized cross-sectional diagram and a top-view diagram of a conventional mutual capacitive touch sensing display panel.
Figure 1B:
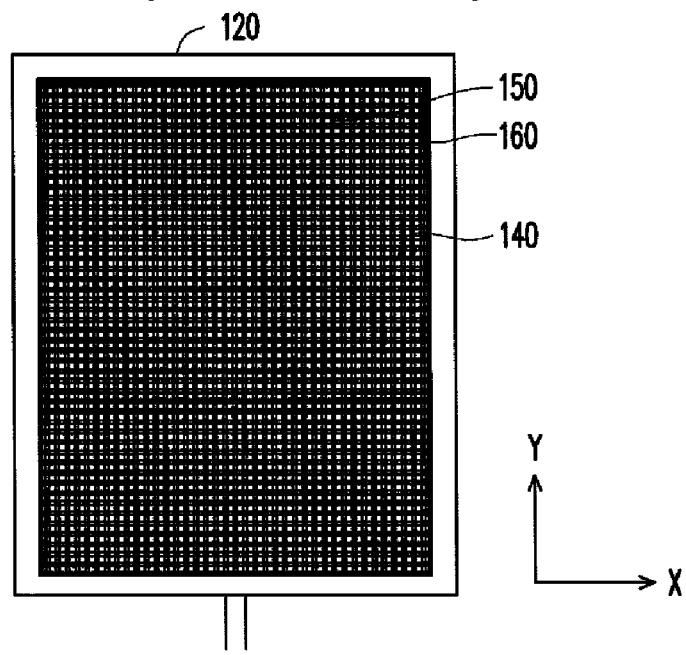
Figures 1C, 1D:
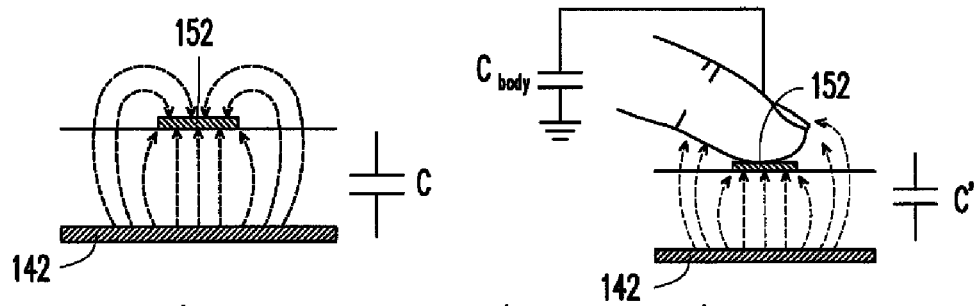
FIG. 1C is a diagram showing the usual electric field lines generated by an electrode.
FIG. 1D is a diagram showing the electric field lines generated by an electrode touched by a conductor.

Reference will now be made in detail to the present preferred embodiments of the invention, examples of which are illustrated in the accompanying drawings. Wherever possible, the same reference numbers are used in the drawings and the description to refer to the same or like parts.

The First Embodiment

Figure 2A:
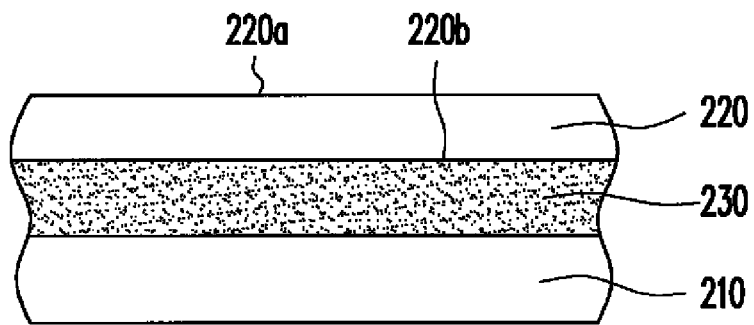
FIGS. 2A and 2B are respectively a localized cross-sectional diagram and a top-view diagram of a touch sensing display panel of the present invention.
Figure 2B:
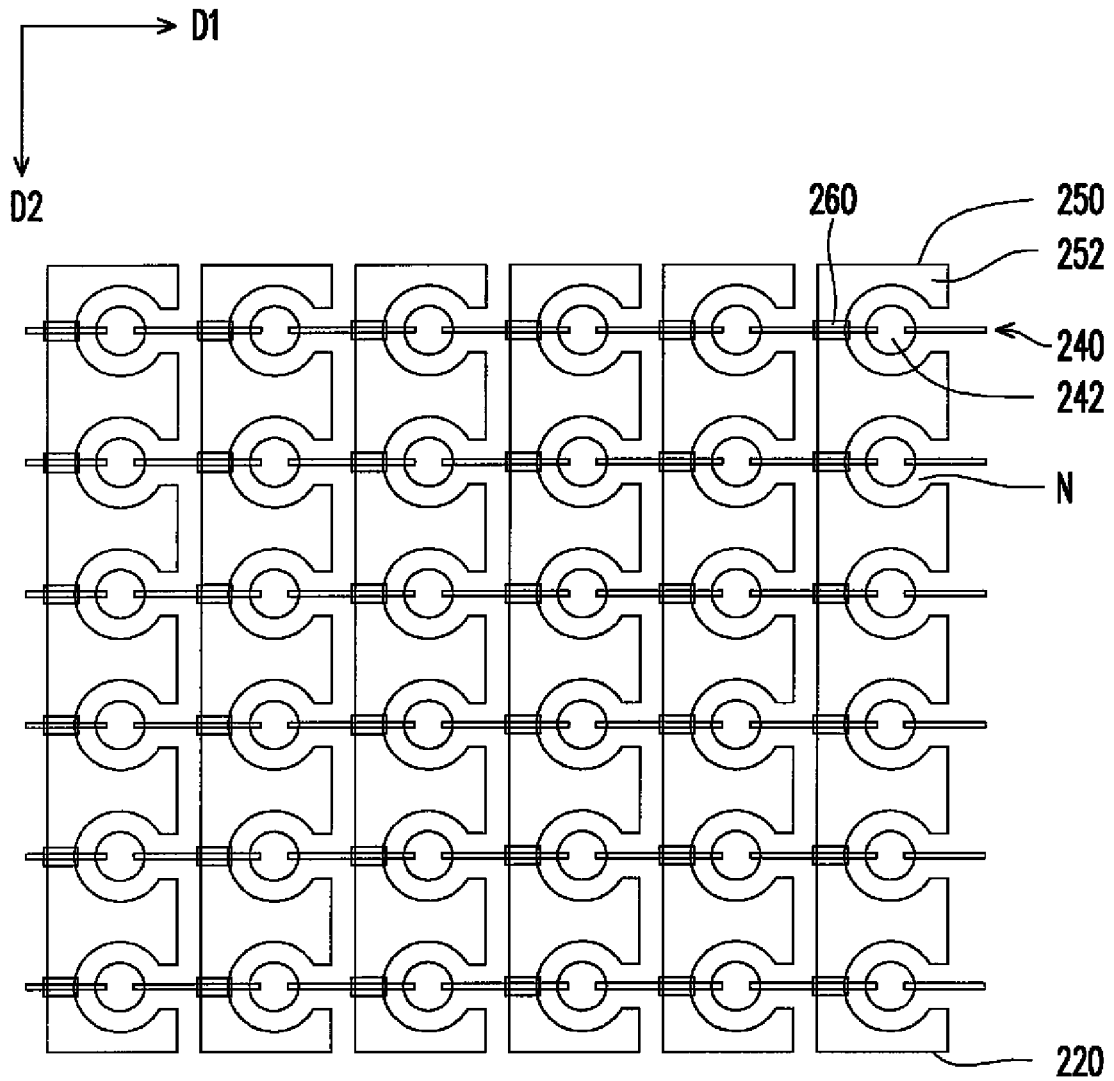

FIGS. 2A and 2B are respectively a localized cross-sectional diagram and a top-view diagram of a touch sensing display panel of the present invention. Referring to FIGS. 2A and 2B, a touch sensing display panel 200 includes an active device array substrate 210, an opposite substrate 220, a display medium layer 230, a plurality of inner electrode series 240 and a plurality of outer electrode series 250. The opposite substrate 220 is disposed over the active device array substrate 210, and the display medium layer 230 is disposed between the active device array substrate 210 and the opposite substrate 220. In the embodiment, the active device array substrate 210 is, for example, a transistor array substrate or other active device array substrates, and the opposite substrate 220 is, for example, a color filter substrate. In addition, the display medium layer 230 is, for example, a liquid crystal layer, an organic light emitting layer or an electrophoretic layer. It is well known by a person skilled in the art and therefore will not be described in detail.

Certainly, the present invention does not limit the types of the active device array substrate 210 and the opposite substrate 220. In other feasible embodiments however, the active device array substrate 210 can be a color filter on array substrate (COA substrate) or an array on color filter substrate (AOC substrate) as well.

The inner electrode series 240 are disposed on the opposite substrate 220 and extend along a first direction D1, wherein each of the inner electrode series 240 includes a plurality of inner ring electrodes 242 electrically connected to each other. In the embodiment, the inner electrode series 240 are electrically insulated from each other, and the material of the inner ring electrodes 242 is, for example, transparent conductive material, such as indium tin oxide (ITO) or other similar material.

The outer electrode series 250 are disposed on the opposite substrate 220 and extend along a second direction D2, wherein each of the outer electrode series 250 includes a plurality of outer ring electrodes 252 electrically connected to each other. Each of the inner ring electrodes 242 is respectively surrounded by one of the outer ring electrodes 252 and the first direction D1 is different from the second direction D2. In the embodiment, each of the outer electrode series 250 is a bar-shaped conductor. The bar-shaped conductor has a plurality of notches N. In more details, the notches N can be ones with circular profile, polygon profile or other profiles, and a part of the inner ring electrodes 242 is located in the above-mentioned notches N. In other embodiments, the outer ring electrodes 252 can have circular profile or polygon profile.

In the embodiment, the outer electrode series 250 are electrically insulated from each other, the material of the outer ring electrodes 252 is, for example, transparent conductive material, the inner electrode series 240 and the outer electrode series 250 are fabricated by using the same thin film deposition process, and the inner electrode series 240 and the outer electrode series 250 can be disposed on an outer surface 220a or an inner surface 220b of the opposite substrate 220. In the embodiment, the first direction D1 is different from the second direction D2; for example, the first direction D1 is substantially perpendicular to the second direction D2.

Figure 2D:
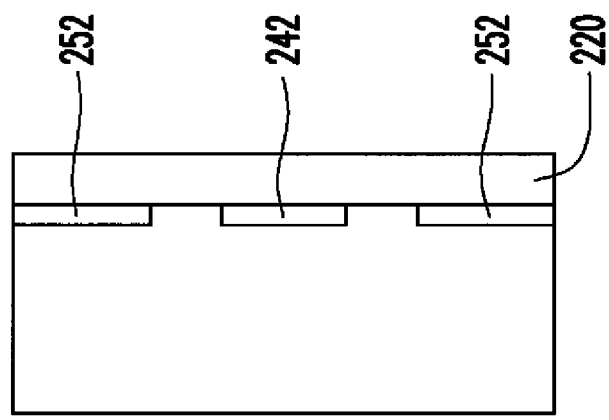
FIGS. 2D and 2E are respectively the cross-sectional diagrams of FIG. 2C along line I-I' and line A-A'.
Figure 2C:
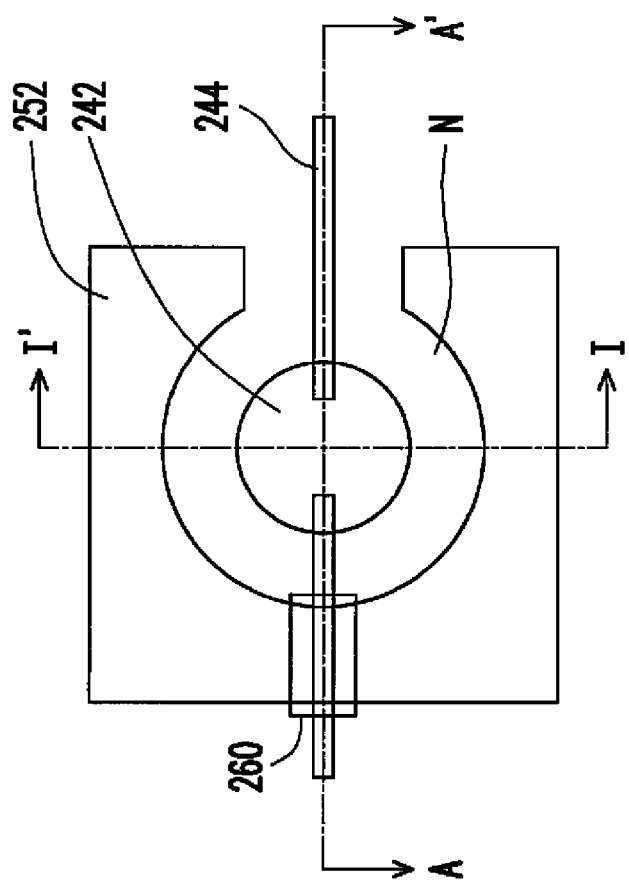
FIG. 2C is a localized enlarged diagram of FIG. 2B.
Figure 2E:
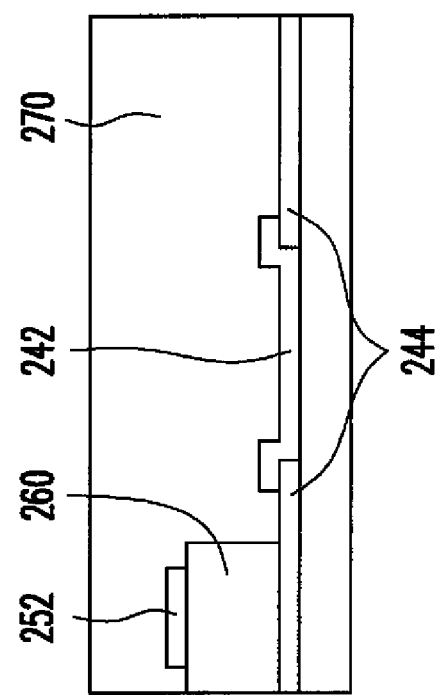

FIG. 2C is a localized enlarged diagram of FIG. 2B, and FIGS. 2D and 2E are respectively the cross-sectional diagrams of FIG. 2C along line I-I' and line A-A'. Referring to FIGS. 2C-2E, in the embodiment, each of the inner electrode series 240 further includes a plurality of first bridge lines 244, and each of the first bridge lines 244 is connected between two adjacent inner ring electrodes 242, as shown in FIG. 2C. In the embodiment, the material of the first bridge line 244 is, for example, transparent conductive material, metal material or other materials.

In addition, the touch sensing display panel 200 of the embodiment further includes a patterned dielectric layer 260 and a protection layer 270, wherein the patterned dielectric layer 260 is located at the intersections of the inner electrode series 240 and the outer electrode series 250. The inner electrode series 240 and the outer electrode series 250 are electrically insulated from each other so as to avoid short-circuit, as shown in FIG. 2C. The protection layer 270 covers the inner electrode series 240 and the outer electrode series 250, as shown in FIG. 2E.

Figure 3A:
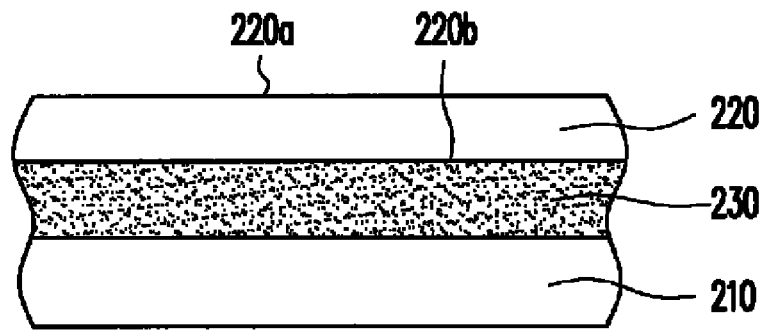
FIGS. 3A and 3B are respectively a localized cross-sectional diagram and a top-view diagram of a touch sensing display panel of the present invention.
Figure 3B:
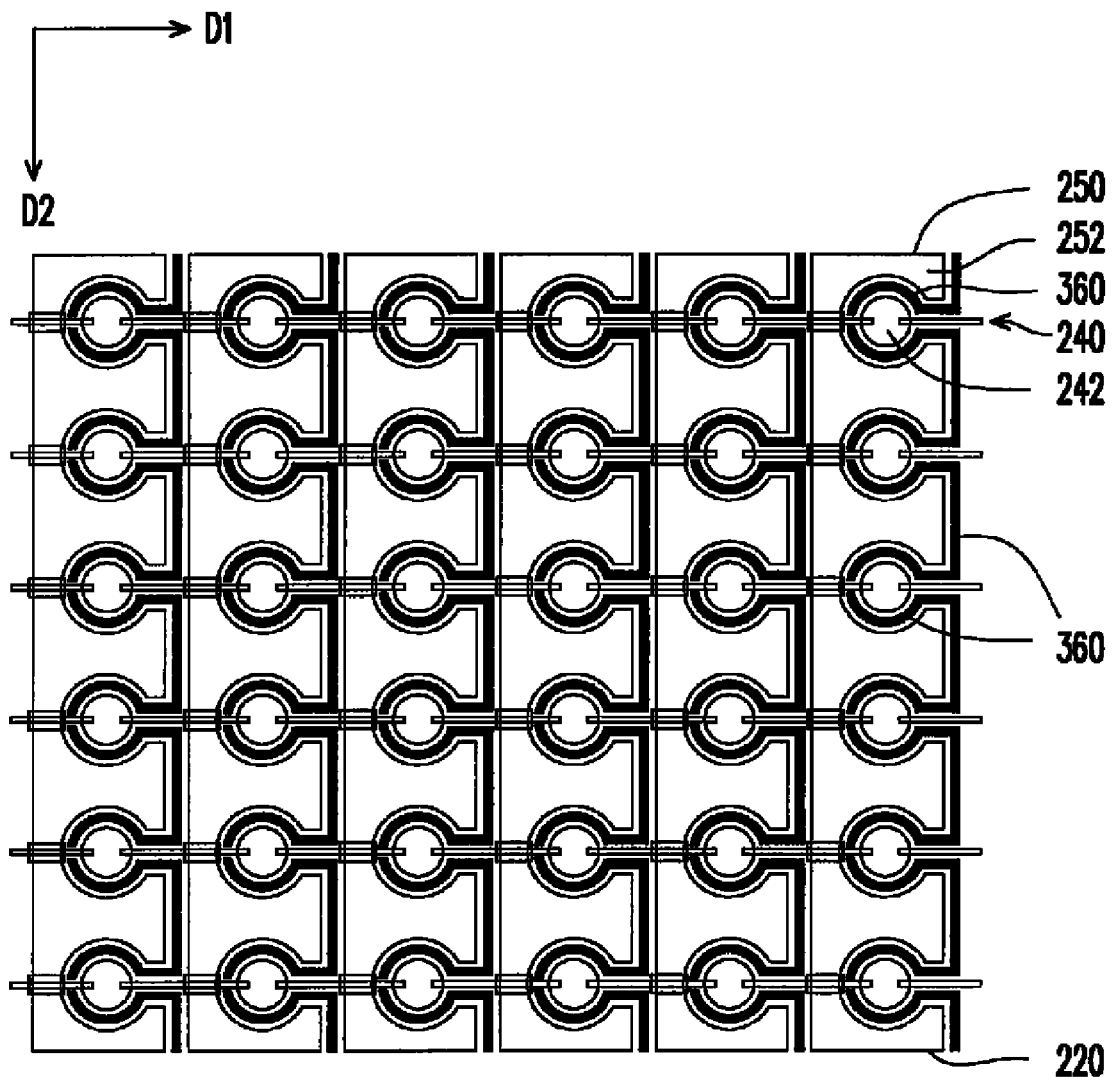
Figure 3D:
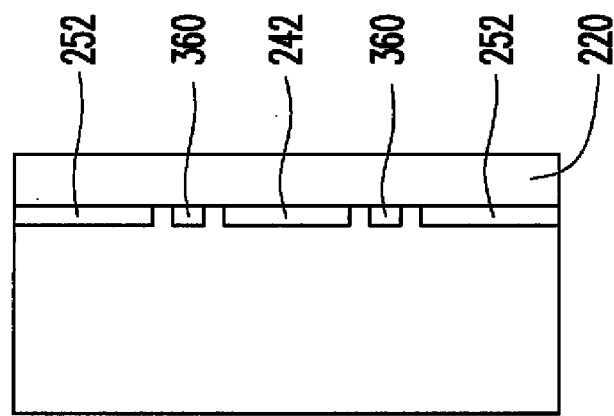
FIGS. 3D and 3E are respectively the cross-sectional diagrams of FIG. 3C along line I-I' and line A-A'.
Figure 3C:
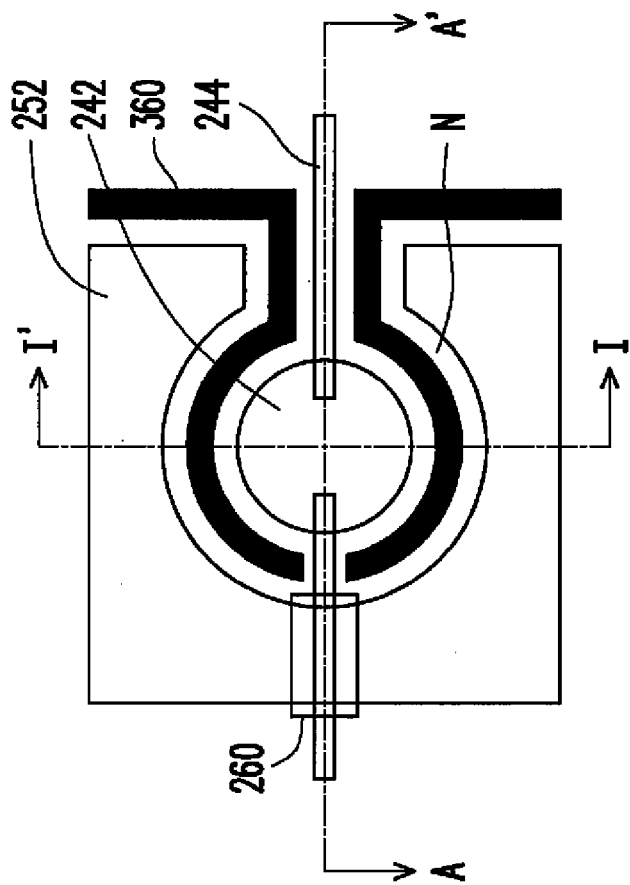
FIG. 3C is a localized enlarged diagram of FIG. 3B.
Figure 3E:
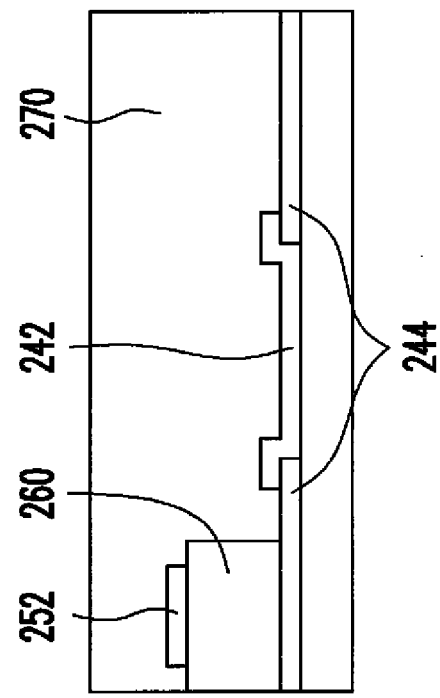

FIGS. 3A and 3B are respectively a localized cross-sectional diagram and a top-view diagram of a touch sensing display panel of the present invention, FIG. 3C is a localized enlarged diagram of FIG. 3B, FIGS. 3D and 3E are respectively the cross-sectional diagrams of FIG. 3C along line I-I' and line A-A'. Referring to FIGS. 3A-3E, the touch sensing display panel 300 of the embodiment is similar to the touch sensing display panel 200, except that the touch sensing display panel 300 of the embodiment further includes a plurality of floating electrodes 360, which are disposed on the opposite substrate 220 and surround the outer electrode series 250 and the inner electrode series 240. The floating electrodes 360 extend into the spaces between the inner ring electrodes 242 and the outer ring electrodes 252. In the embodiment, by deploying the floating electrodes 360, not only the transmittance uniformity and the visual effect of the touch sensing display panel 300 can be effectively improved, but also crosstalk phenomena between the adjacent electrodes can be reduced, so that the manipulation sensitivity can be promoted. It can be seen from FIGS. 3A-3E that the floating electrodes 360 extending into the spaces between the inner ring electrodes 242 and the outer ring electrodes 252 comprise a plurality of separated conductive patterns.

The Second Embodiment

Figure 4A:
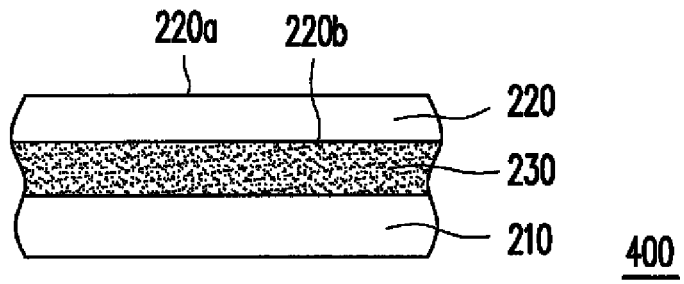
FIGS. 4A and 4B are respectively a localized cross-sectional diagram and a top-view diagram of a touch sensing display panel of the present invention.
Figure 4B:
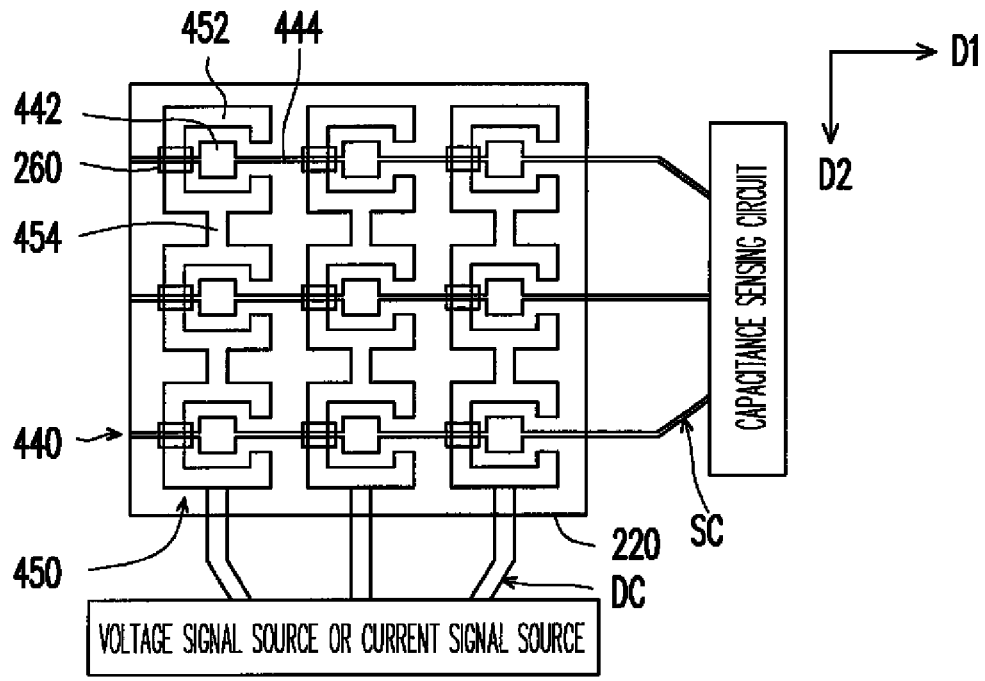

FIGS. 4A and 4B are respectively a localized cross-sectional diagram and a top-view diagram of a touch sensing display panel of the present invention. Referring to FIGS. 4A and 4B, the touch sensing display panel 400 includes an active device array substrate 210, an opposite substrate 220, a display medium layer 230, a plurality of inner electrode series 440 and a plurality of outer electrode series 450. The opposite substrate 220 is disposed over the active device array substrate 210 and the display medium layer 230 is disposed between the active device array substrate 210 and the opposite substrate 220. Certainly, the present invention does not limit the types of the active device array substrate 210, the display medium layer 230 and the opposite substrate 220.

The inner electrode series 440 are disposed on the opposite substrate 220 and extend along a first direction D1, wherein each of the inner electrode series 440 includes a plurality of inner ring electrodes 442 electrically connected to each other. In the embodiment, the inner electrode series 440 are electrically insulated from each other, and the material of the inner ring electrodes 442 is, for example, transparent conductive material.

In the embodiment, each of the inner electrode series 440 further includes a plurality of first bridge lines 444 and each of the first bridge lines 444 is connected between two adjacent inner ring electrodes 442, as shown in FIG. 4B. The material of the first bridge lines 444 is, for example, transparent conductive material, metal material or other materials.

The outer electrode series 450 are disposed on the opposite substrate 220 and extend along a second direction D2, wherein each of the outer electrode series 450 includes a plurality of outer ring electrodes 452 electrically connected to each other. Each of the inner ring electrodes 442 is respectively surrounded by one of the outer ring electrodes 452 and the first direction D1 is different from the second direction D2. In the embodiment, each of the outer electrode series 450 further includes a plurality of second bridge lines 454, and each of the second bridge lines 454 is connected between two adjacent outer ring electrodes 452, as shown in FIG. 4B. In the embodiment, the outer electrode series 450 are electrically insulated from each other. The material of the outer ring electrodes 452 is, for example, transparent conductive material, and the inner electrode series 440 and the outer electrode series 450 are fabricated by using the same thin film deposition process. The inner electrode series 440 and the outer electrode series 450 can be disposed on an outer surface 220a or an inner surface 220b of the opposite substrate 220. In the embodiment, the first direction D1 and the second direction D2 are substantially perpendicular to each other.

In addition, the touch sensing display panel 400 of the embodiment further includes a patterned dielectric layer 260, which is located at the intersections of the inner electrode series 440 and the outer electrode series 450 so as to electrically insulate the inner electrode series 440 from the outer electrode series 450 to avoid short-circuit, as shown in FIG. 4B.

In the embodiment, the touch sensing display panel 400 further includes a driving circuit DC and a sensing circuit SC, wherein the driving circuit DC can be electrically connected to the outer electrode series 450 and the sensing circuit SC can be electrically connected to the inner electrode series 440. With the above-mentioned wiring, the outer ring electrodes 452 serve as driving electrodes and the inner ring electrodes 442 serve as sensing electrodes. In other embodiments, the driving circuit DC can be electrically connected to the inner electrode series 440 and the sensing circuit SC can be electrically connected to the outer electrode series 450. With the above-mentioned wiring, the outer ring electrodes 452 serve as sensing electrodes and the inner ring electrodes 442 serve as driving electrodes.

Figure 4C:
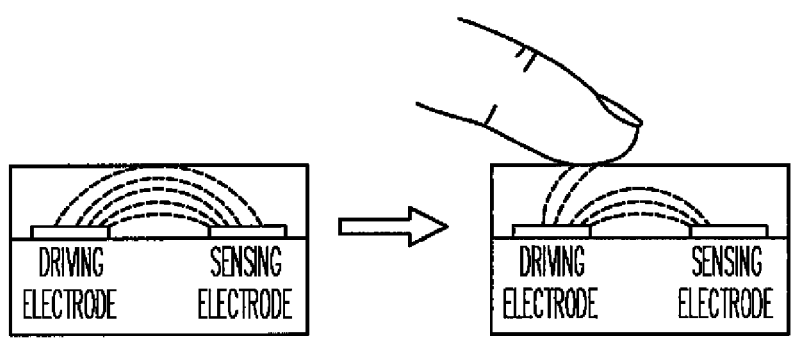
FIG. 4C is a diagram showing the electric field lines of the touch sensing display panel of FIG. 4B which is touched by a conductor.

FIG. 4C is a diagram showing the electric field lines of the touch sensing display panel of FIG. 4B which is touched by a conductor. Referring to FIGS. 4B and 4C, when a conductor (for example, a human's finger) touches the touch sensing display panel 400, the capacitance between the sensing electrode and the driving electrode is changed, the changed signal is then delivered to a controller for calculating the coordinates of the touching point.

Figures 5A, 5B:
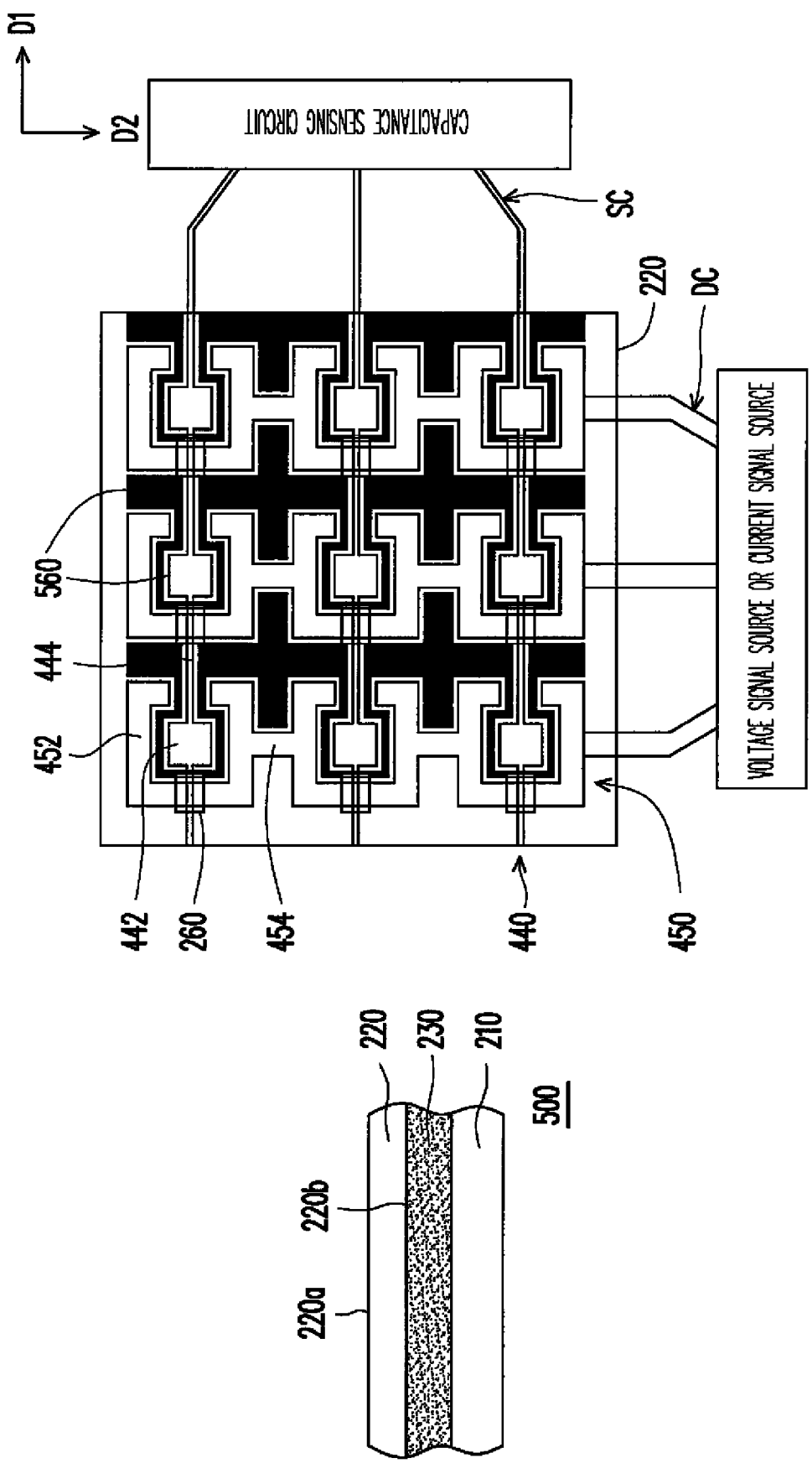
FIGS. 5A and 5B are respectively a localized cross-sectional diagram and a top-view diagram of a touch sensing display panel of the present invention.

FIGS. 5A and 5B are respectively a localized cross-sectional diagram and a top-view diagram of a touch sensing display panel of the present invention. Referring to FIGS. 5A and 5B, the touch sensing display panel 500 of the embodiment is similar to the touch sensing display panel 400, except that the touch sensing display panel 500 of the embodiment further includes a plurality of floating electrodes 560, which are disposed on the opposite substrate 220 and surround the outer electrode series 450 and the inner electrode series 440. The floating electrodes 560 extend into the spaces between the inner ring electrodes 442 and the outer ring electrodes 452. In the embodiment, by deploying the floating electrodes 560, not only the transmittance uniformity and the visual effect of the touch sensing display panel 500 can be effectively improved, but also crosstalk phenomena between the adjacent electrodes can be reduced, so that the manipulation sensitivity can be promoted. It can be seen from FIGS. 5A and 5B that the floating electrodes 560 extending into the spaces between the inner ring electrodes 442 and the outer ring electrodes 452 comprise a plurality of separated conductive patterns.

The Third Embodiment

FIG. 6A is a top-view diagram of a touch sensing substrate of the present invention and FIG. 6B is a localized enlarged diagram of FIG. 6A. Referring to FIGS. 6A and 6B, the touch sensing substrate 600 includes a substrate 620, a plurality of inner electrode series 240, a plurality of outer electrode series 250 and a plurality of floating electrodes 360, wherein the substrate 620 of the touch sensing substrate 600 can be made of glass, plastic prepreg, sheet or other appropriate components.

The inner electrode series 240 are disposed on the substrate 620 and extend along a first direction D1, wherein each of the inner electrode series 240 includes a plurality of inner ring electrodes 242 electrically connected to each other. In the embodiment, the inner electrode series 240 are electrically insulated from each other, and the material of the inner ring electrodes 242 is, for example, transparent conductive material.

The outer electrode series 250 are disposed on the substrate 620 and extend along a second direction D2, wherein each of the outer electrode series 250 includes a plurality of outer ring electrodes 252 electrically connected to each other. Each of the inner ring electrodes 242 is respectively surrounded by one of the outer ring electrodes 252 and the first direction D1 is different from the second direction D2. In the embodiment, each of the outer electrode series 250 is a bar-shaped conductor. The bar-shaped conductor has a plurality of notches N. In more details, the notches N can be ones with circular profile, polygon profile or other profiles, and a part of the inner ring electrodes 242 is located in the above-mentioned notches N. In other embodiments, the outer ring electrodes 252 can have circular profile or polygon profile.

In the embodiment, the outer electrode series 250 are electrically insulated from each other, the material of the outer ring electrodes 252 is, for example, transparent conductive material, the inner electrode series 240 and the outer electrode series 250 are fabricated by using the same thin film deposition process, and the first direction D1 is substantially perpendicular to the second direction D2.

The floating electrodes 360 are disposed on the substrate 620 and surround the outer electrode series 250 and the inner electrode series 240. The floating electrodes 360 extend into the spaces between the inner ring electrodes 242 and the outer ring electrodes 252. In the embodiment, by deploying the floating electrodes 360, not only the transmittance uniformity and the visual effect of the touch sensing substrate 600 can be effectively improved, but also crosstalk phenomena between the adjacent electrodes can be reduced, so that the manipulation sensitivity can be promoted.

FIGS. 6C and 6D are respectively the cross-sectional diagrams of FIG. 6A along line I-I' and line A-A'. Referring to FIGS. 6C and 6D, in the embodiment, each of the inner electrode series 240 further includes a plurality of first bridge lines 244, and each of the first bridge lines 244 is connected between two adjacent inner ring electrodes 242, as shown in FIG. 6C. In the embodiment, the material of the first bridge line 244 is, for example, transparent conductive material, metal material or other materials.

In addition, the touch sensing substrate 600 of the embodiment further includes a patterned dielectric layer 260, wherein the patterned dielectric layer 260 is located at the intersections of the inner electrode series 240 and the outer electrode series 250. The inner electrode series 240 and the outer electrode series 250 are electrically insulated from each other so as to avoid short-circuit, as shown in FIG. 6D.

Figure 7:
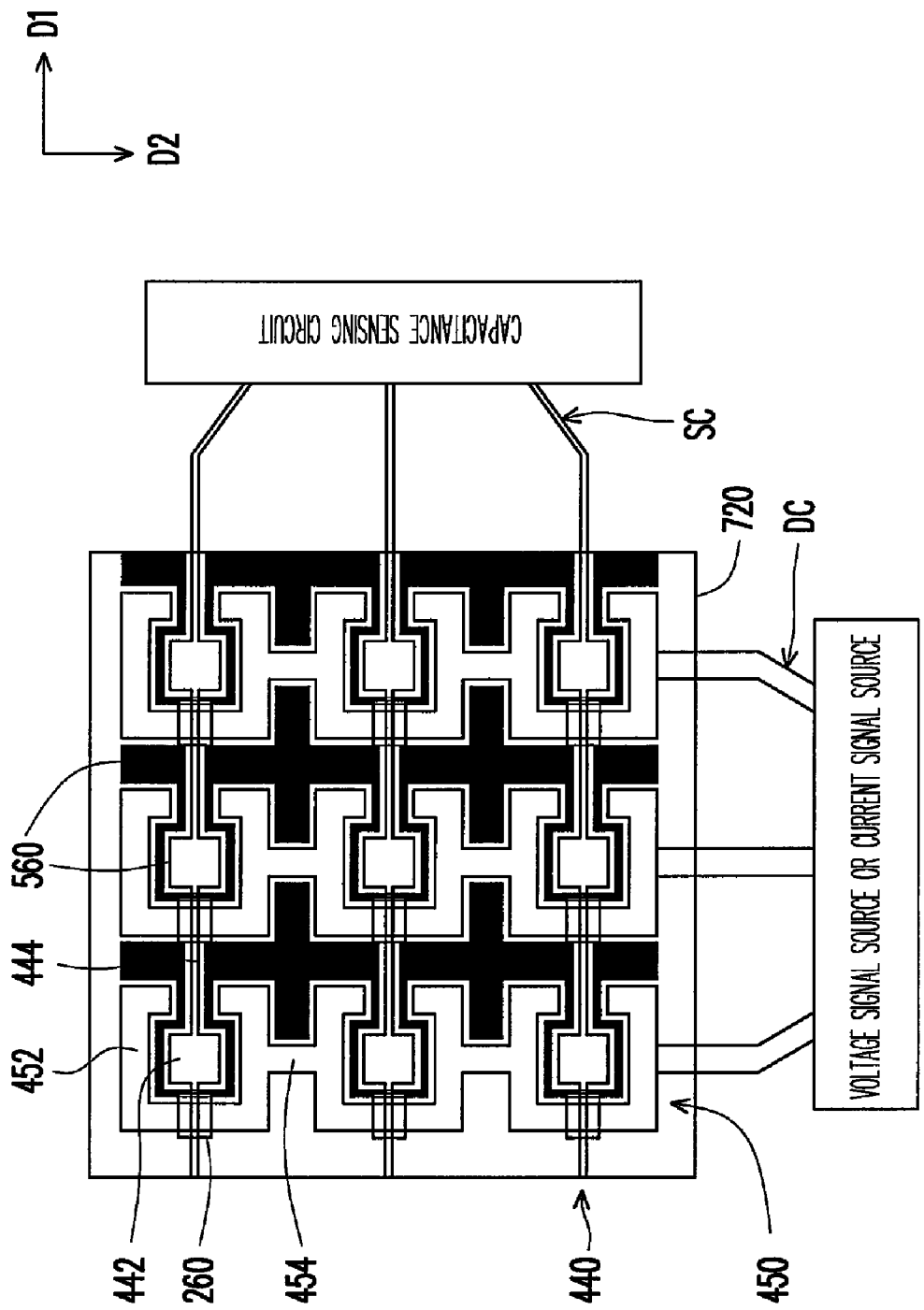
FIG. 7 is a top-view diagram of a touch sensing substrate of the present invention.

FIG. 7 is a top-view diagram of a touch sensing substrate of the present invention. Referring to FIG. 7, the touch sensing substrate 700 includes a substrate 720, a plurality of inner electrode series 440, a plurality of outer electrode series 450 and a plurality of floating electrodes 560, wherein the substrate 720 of the touch sensing substrate 700 can be made of glass, plastic prepreg, sheet or other appropriate components.

The inner electrode series 440 are disposed on the substrate 720 and extend along a first direction D1, wherein each of the inner electrode series 440 includes a plurality of inner ring electrodes 442 electrically connected to each other. In the embodiment, the inner electrode series 440 are electrically insulated from each other, and the material of the inner ring electrodes 442 is, for example, transparent conductive material.

In the embodiment, each of the inner electrode series 440 further includes a plurality of first bridge lines 444 and each of the first bridge lines 444 is connected between two adjacent inner ring electrodes 442. The material of the first bridge lines 444 in the embodiment is, for example, transparent conductive material, metal material or other materials.

The outer electrode series 450 are disposed on the substrate 720 and extend along a second direction D2, wherein each of the outer electrode series 450 includes a plurality of outer ring electrodes 452 electrically connected to each other. Each of the inner ring electrodes 442 is respectively surrounded by one of the outer ring electrodes 452 and the first direction D1 is different from the second direction D2. In the embodiment, each of the outer electrode series 450 further includes a plurality of second bridge lines 454, and each of the second bridge lines 454 is connected between two adjacent outer ring electrodes 452, as shown in FIG. 7. In the embodiment, the outer electrode series 450 are electrically insulated from each other. The material of the outer ring electrodes 452 is, for example, transparent conductive material, and the inner electrode series 440 and the outer electrode series 450 are fabricated by using the same thin film deposition process. In the embodiment, the first direction D1 and the second direction D2 are substantially perpendicular to each other.

In addition, the touch sensing substrate 700 of the embodiment further includes a patterned dielectric layer 260, which is located at the intersections of the inner electrode series 440 and the outer electrode series 450 so as to electrically insulate the inner electrode series 440 from the outer electrode series 450 to avoid short-circuit, as shown in FIG. 7.

In the embodiment, the touch sensing substrate 700 further includes a driving circuit DC and a sensing circuit SC, wherein the driving circuit DC can be electrically connected to the outer electrode series 450 and the sensing circuit SC can be electrically connected to the inner electrode series 440. With the above-mentioned wiring, the outer ring electrodes 452 serve as driving electrodes and the inner ring electrodes 442 serve as sensing electrodes. In other embodiments, the driving circuit DC can be electrically connected to the inner electrode series 440 and the sensing circuit SC can be electrically connected to the outer electrode series 450. With the above-mentioned wiring, the outer ring electrodes 452 serve as sensing electrodes and the inner ring electrodes 442 serve as driving electrodes.

In summary, the present invention makes a touch sensing structure directly fabricated on the surface of the opposite substrate, which can reduce the overall thickness of the touch sensing display panel and increase the light transmittance of the touch sensing display panel. The touch sensing display panel of the present invention can be fabricated with the processes compatible with the processes currently used in fabricating the regular display panels, which is in favour of saving the production cost. In addition, by deploying the floating electrodes in the touch sensing substrate of the present invention, not only the touch sensing substrate has good visual effect, but also the manipulation sensitivity can be promoted.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A touch sensing display panel, comprising:
    an active device array substrate;
    an opposite substrate, disposed over the active device array substrate;
    a display medium layer, disposed between the active device array substrate and the opposite substrate;
    a plurality of inner electrode series, disposed on the opposite substrate and extending along a first direction, wherein each of the inner electrode series comprises a plurality of inner ring electrodes electrically connected to each other;

a plurality of outer electrode series, disposed on the opposite substrate and extending along a second direction, wherein each of the outer electrode series comprises a plurality of outer ring electrodes electrically connected to each other, each of the inner ring electrodes is respectively surrounded by one of the outer ring electrodes, and the first direction is different from the second direction; and a patterned dielectric layer located at the intersections of the inner electrode series and the outer electrode series.

2. The touch sensing display panel as claimed in claim 1, wherein the active device array substrate comprises a transistor array substrate.

3. The touch sensing display panel as claimed in claim 1, wherein the opposite substrate comprises a color filter substrate.

4. The touch sensing display panel as claimed in claim 1, wherein the display medium layer comprises a liquid crystal layer, an organic light emitting layer or an electrophoretic layer.

5. The touch sensing display panel as claimed in claim 1, wherein the inner electrode series are electrically insulated from each other and the outer electrode series are electrically insulated from each other.

6. The touch sensing display panel as claimed in claim 1, wherein the inner electrode series are electrically insulated from the outer electrode series.

7. The touch sensing display panel as claimed in claim 1, wherein the inner electrode series and the outer electrode series are disposed on an outer surface of the opposite substrate.

8. The touch sensing display panel as claimed in claim 1, wherein the inner electrode series and the outer electrode series are disposed on an inner surface of the opposite substrate.

9. The touch sensing display panel as claimed in claim 1, wherein a material of the inner ring electrodes comprises transparent conductive material.

10. The touch sensing display panel as claimed in claim 1, wherein each of the inner electrode series further comprises a plurality of first bridge lines and each of the first bridge lines is connected between two adjacent inner ring electrodes.

11. The touch sensing display panel as claimed in claim 10, wherein a material of the first bridge lines comprises transparent conductive material or metal material.

12. The touch sensing display panel as claimed in claim 1, wherein a material of the outer ring electrodes comprises transparent conductive material.

13. The touch sensing display panel as claimed in claim 1, wherein each of the outer electrode series further comprises a plurality of second bridge lines and each of the second bridge lines is connected between two adjacent outer ring electrodes.

14. The touch sensing display panel as claimed in claim 13, wherein a material of the second bridge lines comprises transparent conductive material or metal material.

15. The touch sensing display panel as claimed in claim 1, further comprising a plurality of floating electrodes disposed on the opposite substrate and surrounding the outer electrode series and the inner electrode series.

16. The touch sensing display panel as claimed in claim 15, wherein a part of the floating electrodes respectively extends between an inner ring electrodes and an outer ring electrode.

17. The touch sensing display panel as claimed in claim 1, wherein each of the outer electrode series is a bar-shaped conductor, the bar-shaped conductor has a plurality of notches and a part of the inner ring electrodes is located in the notches.

18. The touch sensing display panel as claimed in claim 1, wherein the first direction is perpendicular to the second direction.

19. The touch sensing display panel as claimed in claim 1, further comprising:
a driving circuit, electrically connected to the outer electrode series; and
a sensing circuit, electrically connected to the inner electrode series.

20. The touch sensing display panel as claimed in claim 1, further comprising:
a driving circuit, electrically connected to the inner electrode series; and
a sensing circuit, electrically connected to the outer electrode series.

21. The touch sensing display panel as claimed in claim 1, further comprising a protection layer covering the inner electrode series and the outer electrode series.

22. A touch sensing substrate, comprising:
a substrate;
a plurality of inner electrode series, disposed on the substrate and extending along a first direction, wherein each of the inner electrode series comprises a plurality of inner ring electrodes electrically connected to each other;
a plurality of outer electrode series, disposed on the substrate and extending along a second direction, wherein each of the outer electrode series comprises a plurality of outer ring electrodes electrically connected to each other, each of the inner ring electrodes is respectively surrounded by one of the outer ring electrodes and the first direction and the second direction are different from each other;
a plurality of floating electrodes, disposed on the substrate and surrounding the outer electrode series and the inner electrode series; and
a patterned dielectric layer located at the intersections of the inner electrode series and the outer electrode series.

23. The touch sensing substrate as claimed in claim 22, wherein the inner electrode series are electrically insulated from each other and the outer electrode series are electrically insulated from each other.

24. The touch sensing substrate as claimed in claim 22, wherein the inner electrode series are electrically insulated from the outer electrode series.

25. The touch sensing substrate as claimed in claim 22, wherein a material of the inner ring electrodes comprises transparent conductive material.

26. The touch sensing substrate as claimed in claim 22, wherein each of the inner electrode series further comprises a plurality of first bridge lines and each of the first bridge lines is connected between two adjacent inner ring electrodes.

27. The touch sensing substrate as claimed in claim 26, wherein a material of the first bridge lines comprises transparent conductive material or metal material.

28. The touch sensing substrate as claimed in claim 22, wherein a material of the outer ring electrodes comprises transparent conductive material.

29. The touch sensing substrate as claimed in claim 22, wherein each of the outer electrode series further comprises a plurality of second bridge lines and each of the second bridge lines is connected between two adjacent outer ring electrodes.

30. The touch sensing substrate as claimed in claim 29, wherein a material of the second bridge lines comprises transparent conductive material or metal material.

31. The touch sensing substrate as claimed in claim 22, wherein a part of the floating electrodes respectively extends between an inner ring electrodes and an outer ring electrode.

32. The touch sensing substrate as claimed in claim 22, wherein each of the outer electrode series is a bar-shaped conductor, the bar-shaped conductor has a plurality of notches and a part of the inner ring electrodes is located in the notches.

33. The touch sensing substrate as claimed in claim 22, wherein the first direction is perpendicular to the second direction.

34. The touch sensing substrate as claimed in claim 22, further comprising:
   a driving circuit, electrically connected to the outer electrode series; and
   a sensing circuit, electrically connected to the inner electrode series.

35. The touch sensing substrate as claimed in claim 22, further comprising:
   a driving circuit, electrically connected to the inner electrode series; and
   a sensing circuit, electrically connected to the outer electrode series.

36. The touch sensing substrate as claimed in claim 22, further comprising a protection layer covering the inner electrode series and the outer electrode series.

37. A touch sensing substrate, comprising:
   a substrate;
   a plurality of inner electrode series, disposed on the substrate and extending along a first direction, wherein each of the inner electrode series comprises a plurality of inner ring electrodes electrically connected to each other;
   a plurality of outer electrode series, disposed on the substrate and extending along a second direction, wherein each of the outer electrode series comprises a plurality of outer ring electrodes electrically connected to each other, each of the inner ring electrodes is respectively surrounded by one of the outer ring electrodes and the first direction and the second direction are different from each other; and
   a plurality of floating electrodes, disposed on the substrate and surrounding the outer electrode series and the inner electrode series,
   wherein a part of the floating electrodes respectively extends between an inner ring electrodes and an outer ring electrode.

38. A touch sensing substrate, comprising:
   a substrate;
   a plurality of inner electrode series, disposed on the substrate and extending along a first direction, wherein each of the inner electrode series comprises a plurality of inner ring electrodes electrically connected to each other;
   a plurality of outer electrode series, disposed on the substrate and extending along a second direction, wherein each of the outer electrode series comprises a plurality of outer ring electrodes electrically connected to each other, each of the inner ring electrodes is respectively surrounded by one of the outer ring electrodes and the first direction and the second direction are different from each other; and
   a plurality of floating electrodes, disposed on the substrate and surrounding the outer electrode series and the inner electrode series,
   wherein each of the outer electrode series is a bar-shaped conductor, the bar-shaped conductor has a plurality of notches and a part of the inner ring electrodes is located in the notches.

* * * * *